(12) United States Patent
Ryan et al.

(10) Patent No.: US 12,001,304 B2
(45) Date of Patent: *Jun. 4, 2024

(54) SYSTEM AND METHOD FOR CONTACT CENTER FAULT DIAGNOSTICS

(71) Applicant: Cyara Solutions Pty Ltd, Hawthorn (AU)

(72) Inventors: Mark Ryan, Phoenix, AZ (US); Chris Ryan, Phoenix, AZ (US)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,716

(22) Filed: Apr. 26, 2023

(65) Prior Publication Data

US 2024/0103989 A1   Mar. 28, 2024

Related U.S. Application Data

(63) Continuation of application No. 17/975,545, filed on Oct. 27, 2022, now Pat. No. 11,704,214, which is a continuation of application No. 16/656,137, filed on Oct. 17, 2019, now Pat. No. 11,567,846.

(51) Int. Cl.
  *G06F 11/26*   (2006.01)
  *G06F 11/07*   (2006.01)
  *G06F 11/36*   (2006.01)

(52) U.S. Cl.
  CPC .......... *G06F 11/26* (2013.01); *G06F 11/0757* (2013.01); *G06F 11/3632* (2013.01); *H04M 2203/056* (2013.01); *H04M 2203/40* (2013.01); *H04M 2203/558* (2013.01)

(58) Field of Classification Search
  CPC ... G06F 11/0757; G06F 11/26; G06F 11/3632
  See application file for complete search history.

(56) References Cited

U.S. PATENT DOCUMENTS

| | | | |
|---|---|---|---|
| 5,444,820 A * | 8/1995 | Tzes | G06N 3/043 706/900 |
| 6,182,245 B1 * | 1/2001 | Akin | G06F 11/3672 714/38.14 |
| 6,654,905 B1 | 11/2003 | Dickens | |
| 7,246,276 B2 | 7/2007 | Bartz et al. | |
| 8,046,446 B1 * | 10/2011 | Karr | H04L 67/1097 709/223 |
| 10,866,851 B2 | 12/2020 | Basiri et al. | |
| 11,263,111 B2 | 3/2022 | Lang et al. | |
| 11,500,757 B2 * | 11/2022 | Ambichl | G06F 11/3048 |
| 2003/0217039 A1 * | 11/2003 | Kurtz | H04L 63/1408 |
| 2005/0172267 A1 | 8/2005 | Bergin | |

(Continued)

*Primary Examiner* — Joseph O Schell
(74) *Attorney, Agent, or Firm* — Boon Intellectual Property Law, PLLC; Brian S. Boon (57) ABSTRACT

A system and methods for contact center fault diagnostics, comprising a diagnostic engine and test cases used for testing components and services in a contact center, designed to operate on a contact center with a specified test campaign, allowing a contact center's various services and systems to be tested either internally or externally in an automated fashion with specified testcases being used to specify the format and expectations of a specific test, with reports of failures and points of failure being made available to system administrators.

8 Claims, 10 Drawing Sheets

(56) References Cited

U.S. PATENT DOCUMENTS

| | | | |
|---|---|---|---|
| 2006/0195732 A1* | 8/2006 | Deutschle | G06F 11/3688 714/724 |
| 2007/0277154 A1* | 11/2007 | Badwe | G06F 11/3688 717/124 |
| 2014/0181793 A1 | 6/2014 | Kaliappan | |
| 2015/0332147 A1 | 11/2015 | Anastas et al. | |
| 2018/0089011 A1 | 3/2018 | Basiri et al. | |
| 2020/0257612 A1 | 8/2020 | Lang et al. | |

* cited by examiner

SYSTEM AND METHOD FOR CONTACT CENTER FAULT DIAGNOSTICS

CROSS-REFERENCE TO RELATED APPLICATIONS

Priority is claimed in the application data sheet to the following patents or patent applications, each of which is expressly incorporated herein by reference in its entirety:
Ser. No. 17/975,545
Ser. No. 16/656,137

BACKGROUND OF THE INVENTION

Field of the Art

The disclosure relates to the field of contact centers, and more particularly to the field of contact center infrastructure testing and reporting.

Discussion of the State of the Art

Contact center technology is a growing field of interest that is vital to effective communication with customers for many businesses. Many businesses utilize contact centers to manage their customer service needs in one way or another, including technical support, forwarding and mapping customer inquiries to the proper departments whether interior or exterior to the business itself, and handling customer complaints and general questions. However, these systems are varied and bulky, and not easy to diagnose when errors and system failures arise.

It is currently the case that no automated diagnosing system exists for finding errors and failures within a contact center's infrastructure efficiently, and this costs the contact center, and the business or businesses that utilize the center, time, energy, and money to effectively diagnose these faults. Customers do not get the service they desire or expect, and this in turn further harms the reputation of a business utilizing the contact center, resulting in compounded issues due to the lack of effective infrastructure fault diagnostics.

SUMMARY OF THE INVENTION

What is needed, then, is an automated system for contact center fault diagnostics that may be configured specifically for each contact center's infrastructure, and utilize both specific and generic testcase templates to ensure that services and components in a contact center operate effectively, consistently, and predictably.

Accordingly, the inventor has conceived and reduced to practice, a system and methods for contact center fault diagnostics, utilizing a diagnostics engine framework to automatically test services and systems in a contact center and report failures and the points of failure to a system administrator, using campaigns of tests using specific testcase data.

According to a preferred embodiment, a system for contact center fault diagnostics is disclosed, comprising: a database comprising test cases, each test case configured to isolate a root cause of the error and comprising: a chain of known contact center operations associated with the error; a list of components in the chain associated with each operation; and an expected response from each component to an operational instruction; and a diagnostic engine comprising at least a plurality of programming instructions stored in a memory of, and operating on a processor of, a computing device, wherein the plurality of programming instructions, when operating on the processor, cause the computing device to: receive notification of an error in operation of a contact center; retrieve one or more test cases for the error from the database; send an operational instruction to each component in the chain of known contact center operations associated with the error; time the response of each component to each operational instruction; receive a response from each component to each operational instruction; calculate a time of response of each component to each operational instruction; and determine whether each component is a root cause of the error by evaluating whether its response meets a threshold time of response and whether the response received for the component matches the expected response for that component.

According to another preferred embodiment, a method for contact center fault diagnostics is disclosed, comprising the steps of: receiving notification of an error in operation of a contact center, using a diagnostic engine; retrieving one or more test cases for the error from the database, using a diagnostic engine; sending an operational instruction to each component in the chain of known contact center operations associated with the error, using a diagnostic engine; timing the response of each component to each operational instruction, using a diagnostic engine; receiving a response from each component to each operational instruction, using a diagnostic engine; calculating a time of response of each component to each operational instruction, using a diagnostic engine; and determining whether each component is a root cause of the error by evaluating whether its response meets a threshold time of response and whether the response received for the component matches the expected response for that component, using a diagnostic engine.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION OF THE DRAWING FIGURES

The inventor has conceived, and reduced to practice, a system and method for contact center fault diagnostics.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
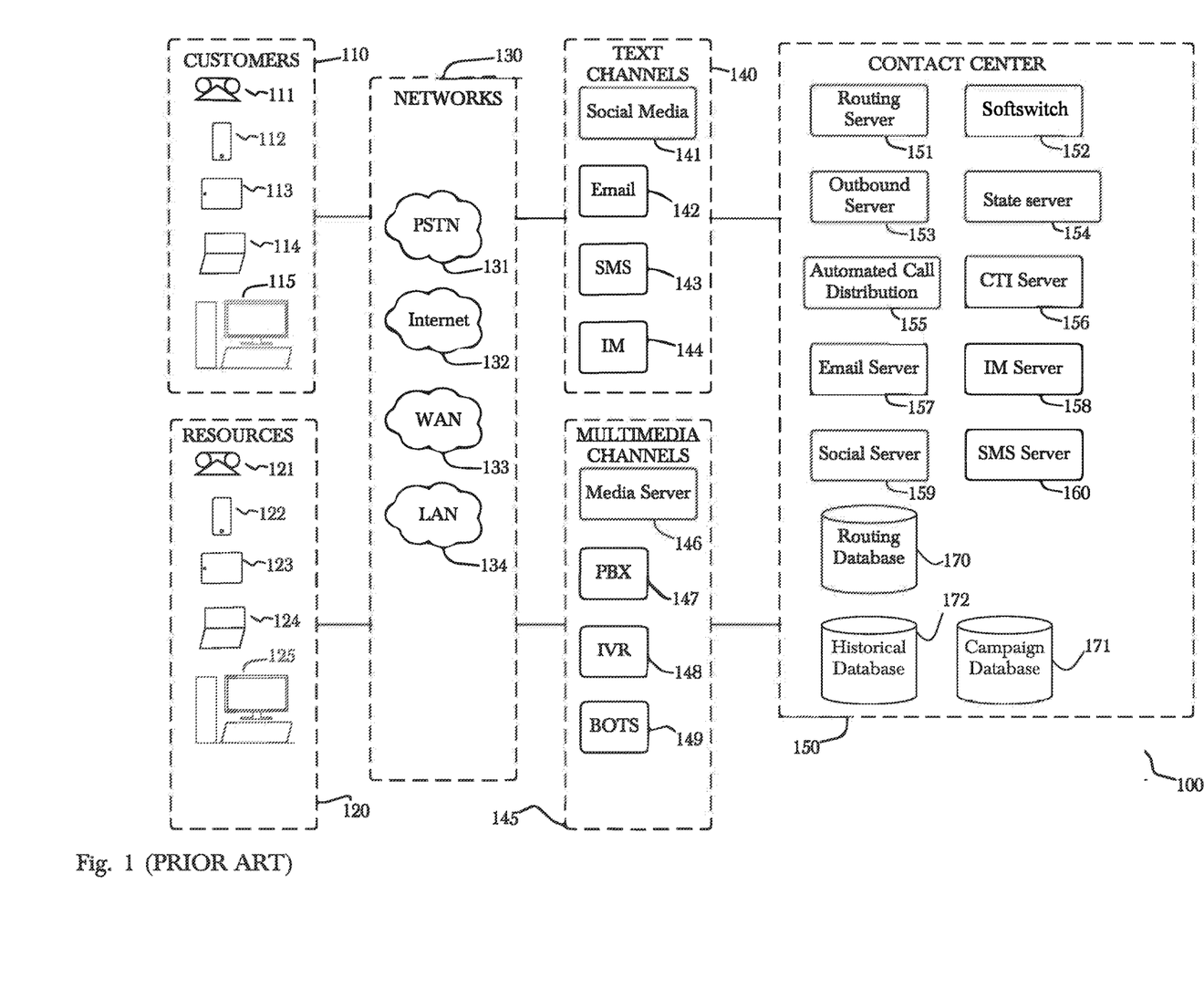
FIG. 1 (PRIOR ART) is a typical system architecture diagram of a contact center including components commonly known in the art.

FIG. 1 (PRIOR ART) is a typical system architecture diagram of a contact center 100 known to the art. A contact center is similar to a call center, but a contact center has more features. While a call center may communicate mainly by voice, a contact center may communicate via email; text chat, such as, but not limited to, instant messaging, social media posts, and SMS interaction; and web interfaces in addition to voice communication in order to facilitate communications between a customer endpoint 110 and a resource endpoint 120. Resource 120 may include, but is not limited to, agents, sales representatives, service representatives, or collection agents handling communications with customers 110 on behalf of an enterprise. Resources 120 may be in-house within contact center 100, or may be remote, such as out-sourcing to a third party, or agents working from home. Contact center 100 may be independently operated or networked with additional centers, and may often be linked to a corporate computer network.

Contact center 100 may further comprise network interface 130, text channels 140, multimedia channels 145, and contact center components 150. Text channels 140 may be communications conducted mainly through text, and may comprise social media 141, email 142, short message service (SMS) 143, or instant messaging (IM) 144, and would communicate through their counterparts within contact center components 150, each respectively being social server 159, email server 157, SMS server 160, and IM server 158.

Multimedia channels 145 may be communications conducted through a variety of mediums, and may comprise a media server 146, private branch exchange (PBX) 147, interactive voice response (IVR) 148, and bots 149. Text channels 140 and multimedia channels 145 may act as third parties to engage with outside social media services and so a social server 159 may be required to interact with the third party social media 141. Multimedia channels 145, are typically present in an enterprise's datacenter; but could be hosted in a remote facility, in a cloud facility, or in a multifunction service facility.

Contact center components 150 may comprise a routing server 151, a softswitch 152, an outbound server 153, a computer telephony integration (CTI) server 154, a state and statistics (STAT) server 155, an automated call distribution facility (ACD) 156, an email server 157, an IM server 158, a social server 159, an SMS server 160, a routing database 170, a historical database 172, and a campaign database 171. It is possible that other servers and databases may exist within a contact center, but in this example the referenced components are used. Contact center components 150, including servers, databases, and other key modules that may be present in a typical contact center may work in a black box environment, may be used collectively in one location, or may be spread over a plurality of locations. Contact center components 150 may even be cloud-based, and more than one of each component shown may be present in a single location.

Customers 110 may communicate by use of any known form of communication known in the art, be it by a telephone 111, a mobile smartphone 112, a tablet 113, a laptop 114, or a desktop computer 115, to name a few examples. Similarly, resources 120 may communicate by use of any known form of communication known in the art, be it by a telephone 121, a mobile smartphone 122, a tablet 123, a laptop 124, or a desktop computer 125, to name a few examples. Communication may be conducted through a network interface 130 by way of at least one channel, such as a text channel 140 or a multimedia channel 145, which communicates with a plurality of contact center components 150. Available network interfaces 130 may include, but are not limited to, a public switched telephone networks (PSTN) 131, an internet network 132, a wide area network (WAN) 133, or a local area network (LAN) 134.

To provide a few example cases, a customer calling on telephone handset 111 may connect through PSTN 131 and terminate on PBX 147; a video call originating from tablet 123 may connect through internet connection 132 and terminate on media server 146; or a customer device such as smartphone 112 may connect via WAN 133, and terminate on IVR 148, such as in the case of a customer calling a customer support line for a bank or a utility service. In another example, an email server 157 would be owned by the contact center 100 and would be used to communicate with a third-party email channel 142. The number of communication possibilities are vast between the number of possible devices of resources 120, devices of customers 110, networks 130, text channels 140, multimedia channels 145, and contact center components 150, hence the system diagram on FIG. 1 (PRIOR ART) indicates connections between delineated groups rather than individual connections for clarity.

Continuing from the examples given above, in some conditions where a single medium (such as ordinary telephone calls) is used for interactions that require routing, media server 146 may be more specifically PBX 147, ACD 156, or similar media-specific switching system. Generally, when interactions arrive at media server 146, a route request, or a variation of a route request (for example, an invite message) is sent to softswitch 152 or to an equivalent system such as CTI server 154. A route request may be a data message sent from a media-handling device, such as media server 146, to a signaling system, such as softswitch 152. The message may comprise a request for one or more target destinations to which to send (or route, or deliver) the specific interaction with regard to which the route request was sent. softswitch 152 or its equivalent may, in some cases, carry out any required routing logic itself, or it may forward the route request message to routing server 151. Routing server 151 executes, using statistical data from state server 154 and, optionally, data from routing database 170, a routing script in response to the route request message and sends a response to media server 146 directing it to route the interaction to a specific target in resources 120.

In another case, routing server 151 uses historical information from historical database 172, or real-time information from campaign database 171, or both, as well as configuration information (generally available from a distributed configuration system, not shown for convenience) and information from routing database 170. State server 154 receives event notifications from media server 146, softswitch 152, or both regarding events pertaining to a plurality of specific interactions handled by media server 146, softswitch 152, or both, and state server 154 computes one or more statistics for use in routing based on the received event notifications. Routing database 170 may comprise multiple distinct databases, either stored in one database management system or in separate database management systems. Examples of data that may normally be found in routing database 170 may include, but are not limited to: customer relationship management (CRM) data; data pertaining to one or more social networks, including, but not limited to network graphs capturing social relationships within relevant social networks, or media updates made by members of relevant social networks; skills data pertaining to a members of resources 120, which may be human agents, automated software agents, interactive voice response scripts, and so forth; data extracted from third party data sources including cloud-based data sources such as CRM and other data from SALESFORCE.COM™, credit data from EXPERIAN™, consumer data from DATA.COM™; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of state server 154, routing database 170, campaign database 172, historical database 171, and any associated configuration systems, routing server 151 selects a routing target from among a plurality of available resource devices 120, and routing server 151 then instructs softswitch 152 to route the interaction in question to the selected resource 120, and softswitch 152 in turn directs media server 146 to establish an appropriate connection between customer 110 and target resource 120. In this case, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that customers 110 are generally, but not necessarily, associated with human customers or users. Nevertheless, it should be understood that routing of other work or interaction types is possible, although in any case, is limited to act or change without input from a management team.

Figure 6:
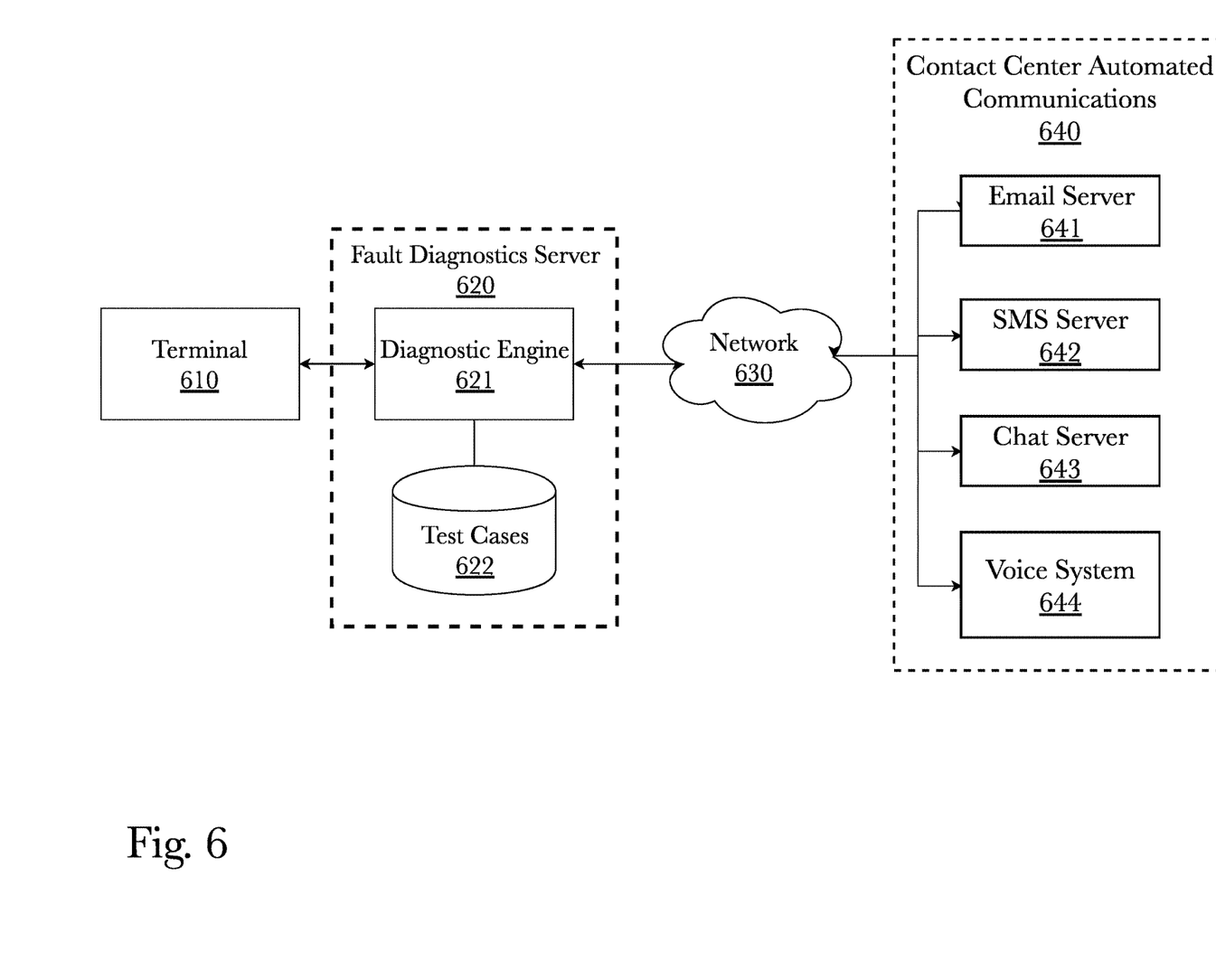
FIG. 6 is a system diagram showing the high-level components used in the operation of a system for contact center fault diagnostics.

FIG. 6 is a system diagram showing the high-level components used in the operation of a system for contact center fault diagnostics. A computer terminal 610 connects to a fault diagnostics system 620, which may be accomplished either over a network, via a direct connection, or the fault diagnostics system 620 may operate as part of the computer terminal 610. This connection or operation allows for the transfer of data between both, such that test campaigns may be created on the terminal 610 and operated by the diagnostics system 620 and the progress and results of test campaigns may be received and monitored by a terminal 610. System settings and configuration may also be specified as required, on a terminal 610, for the diagnostics system 620. The components in a diagnostic system include a datastore for specialized test-cases 622 which may comprise executable tests or the data required for a testing engine to then execute a test on a contact center service, and a diagnostic engine 621 which executes the actual tests, receives notification of successful or failing tests, and handles communication between a terminal 610 and a plurality of contact center automatic communications 640 over a network 630. The data contained in the datastore for test cases 622 comprises at least, in the case of data required for testing, the relevant services and components in a contact center and how to communicate with them, the expected results of various queries sent to the services of a contact center, the acceptable timing of responses from the contact center, and if applicable, the secondary responses from the diagnostics engine and the tertiary response from the contact center. Such a network 630 may be the Internet or some other Wide Area Network (WAN), a Local Area Network (LAN), a Public Switched Telephone Network (PSTN), or some other network. The automated communications in a contact center 640 may comprise any combination of, or all of, an email server 641, a Short Message Service (SMS) server 642, a chat server 643, or a voice system 644 such as an Interactive Voice Response (IVR) server. Communication between a diagnostic engine 621 as part of a diagnostics system 620, and a contact center's automated communications 640, include initial query of at least one of a contact center's automated communication methods 640 by the diagnostics system 620, response or responses from the automated communication methods 640, and depending on the specific tests being run either a further response from a diagnostic system 620 based on stored test cases 622 or evaluation of the initial response from the contact center communications 640. Based on the expected and actual results of the communications, the diagnostic engine 621 then classifies the experience as either successful or unsuccessful, all of which is viewable and manageable by a terminal 610.

Figure 7:
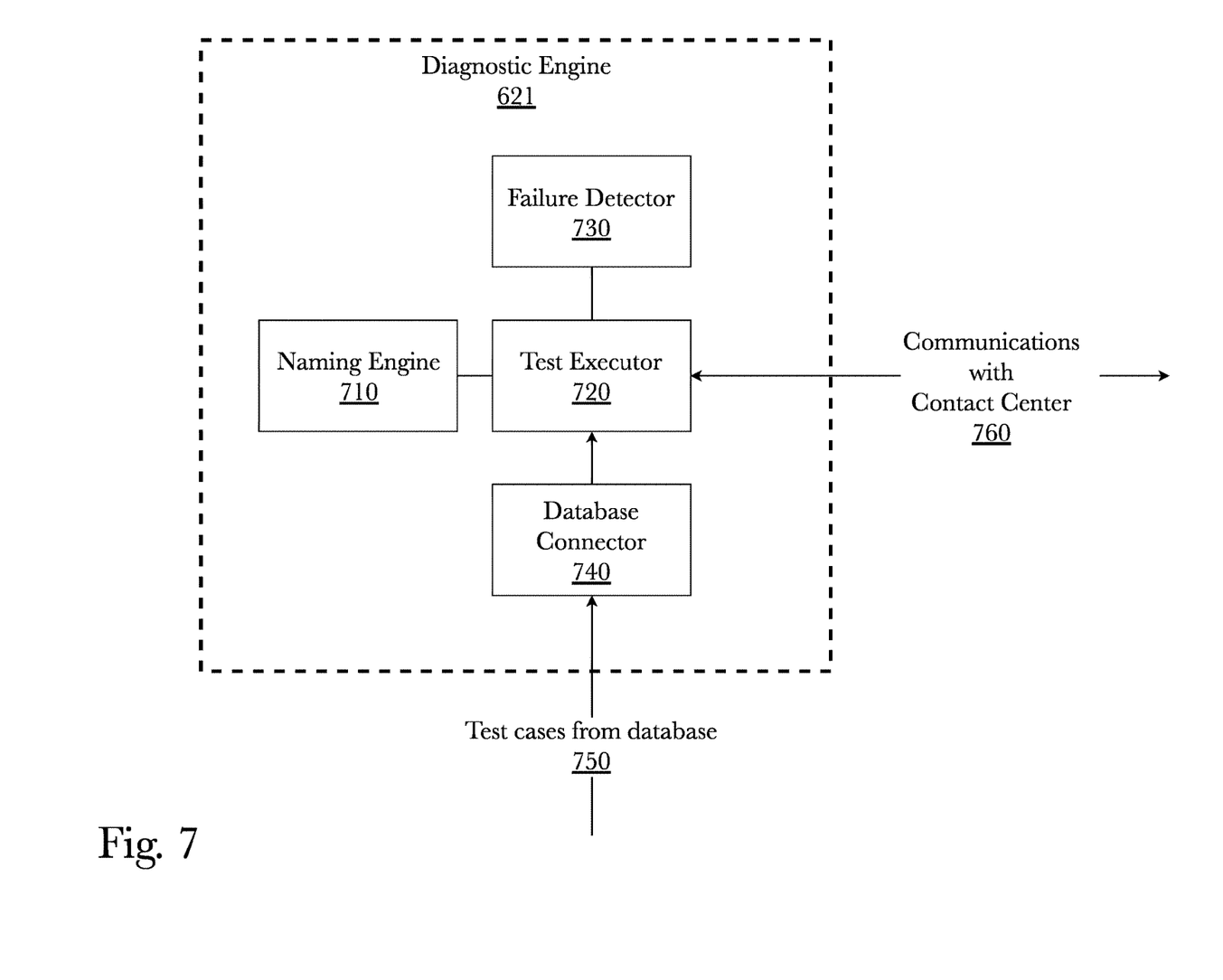
FIG. 7 is a system diagram showing the internal components of a diagnostic engine as operating in a system for contact center fault diagnostics.

FIG. 7 is a system diagram showing the internal components of a diagnostic engine as operating in a system for contact center fault diagnostics. A diagnostics engine 621 operates internal components comprising at least a naming engine 710 which manages the naming of campaigns, tests, and services associated with the diagnostics engine 621, a test executor 720 which executes automated test cases as received from a database connector 740 from a datastore of test cases 750, and a failure detector 730 which specifically works to detect unsuccessful results from automated testing as executed by the test executor 720, and based on responses received from contact center automated communications in response to an automated test execution 760.

Detailed Description of Exemplary Aspects

Figure 8:
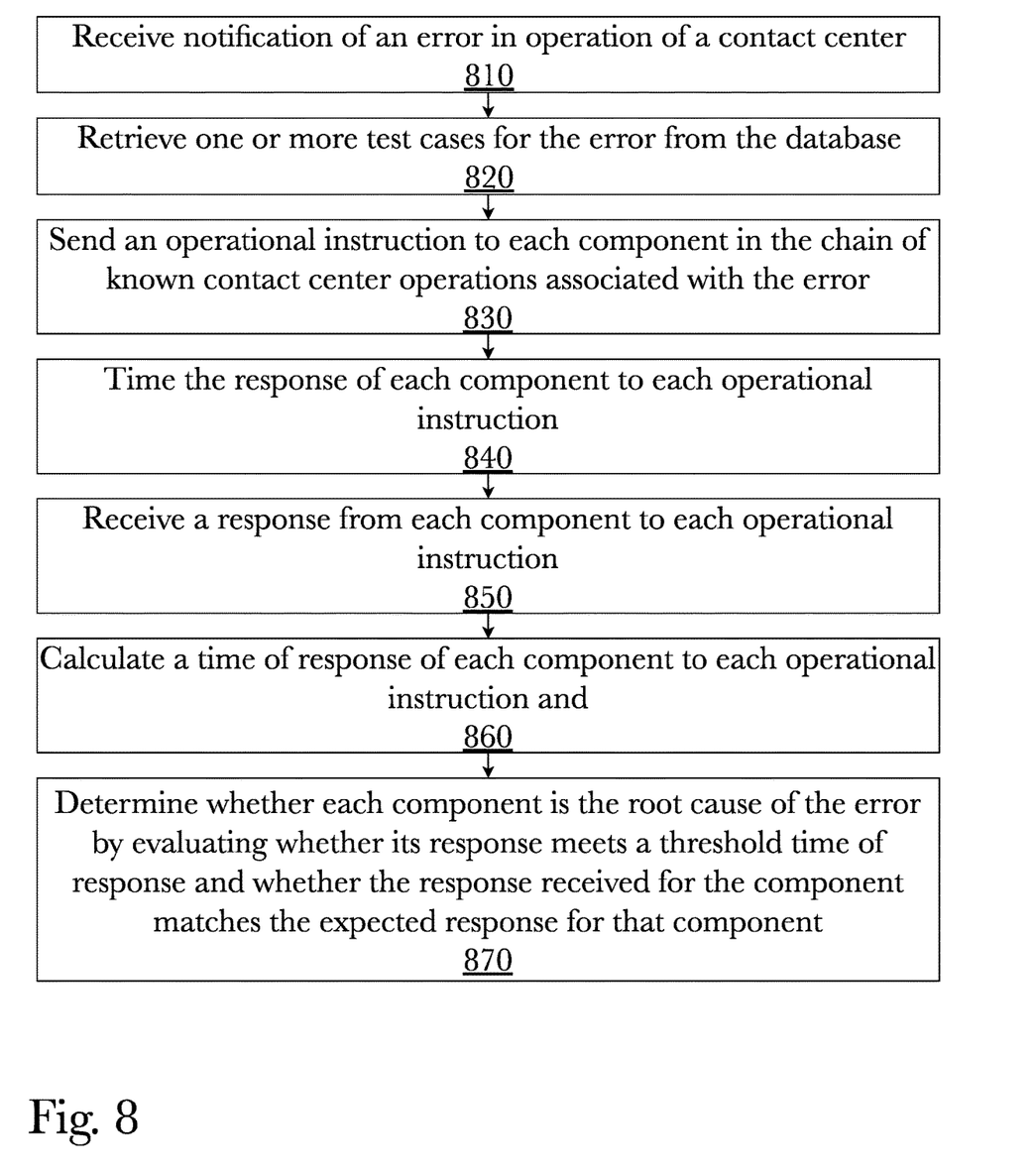
FIG. 8 is a method diagram of the overall operation of a system for call center fault diagnostics.

FIG. 8 is a method diagram of the overall operation of a system for call center fault diagnostics. A first step in the method of the system for diagnostic purposes is to receive notification of an error in operation of a contact center 810, which may or may not be received during automated testing. Such a notification of an error may take the form of a recognized error code, an error message, unexpected responses from automated queries to test the contact center's automated responses, or a failure to even reach the contact center with an initial automated query. A contact center may pro-actively send such a notification to the diagnostics system if configured in such a way. After receiving a notification of failure or error from a contact center, the diagnostic system retrieves one or more test cases for the error from the test cases database 820, allowing it to interpret or execute the test case and send an operational instruction to each component in the chain of known contact center operations associated with the error 830. The timing of the response of each component to each operational instruction is measured 840, the timing ceasing when it receives a response from each component to each operational instruction 850, allowing it to calculate the time of response of each component to each operational instruction 860 and attempt to determine whether any individual component is a root cause of the error by evaluating whether its response meets a threshold time of response and whether the response received for the component matches the expected response for that component 870. Not only is the timing of the received response from each component or service measured, but the received response must match expected test case results, otherwise that component or service will be marked as being a point of failure for the test case.

Figure 9:
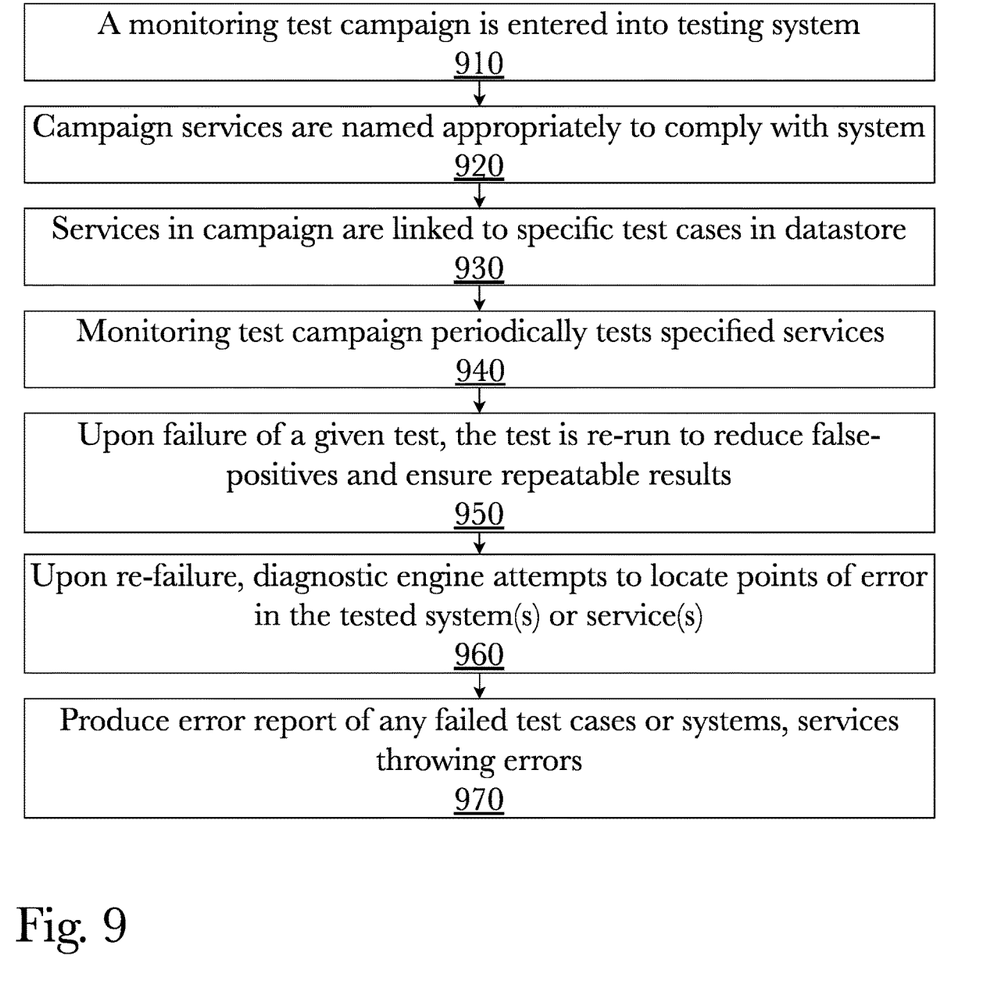
FIG. 9 is a method diagram illustrating test campaign management using a diagnostic engine.

FIG. 9 is a method diagram illustrating test campaign management using a diagnostic engine. First a monitoring test campaign is entered into the testing system 910, a monitoring test campaign being a periodic set of tests that will be performed on a contact center's services and being under a specific ID, such that a test campaign essentially acts as an identifiable sequence of tests to be performed periodically for a specified contact center's services and systems. This may be entered into the system automatically or manually, then requiring campaign services are named appropriately to comply with the system 920. The importance of naming a specific service or system to test is that services may be included in the testing with the diagnostic engine in various embodiments based on their naming or extension, the naming conventions being able to be configured into the system as needed in a specific embodiment. Once services and systems are input into the system under the proper campaign identification, services in the campaign are linked to specific test cases in the datastore 930, so that the diagnostic engine is able to determine what the system or service is supposed to behave like, what is considered the appropriate timing for the responses from the services or systems, and what the proper querying is. For instance, for testing a contact center's chain of services relating to an IVR, test case data may contain data including a connection string to one of the related services or components in the IVR system, the query to be sent, and the expected format or content of the response from the component. After the test cases are linked to the specific tests, a monitoring campaign periodically tests the specified services 940 as specified with the data from the previous steps. Upon failure of a given test, the test is re-run to reduce false-positives and ensure repeatable results 950, such that a single failure that cannot be repeated upon re-testing does not result in progression of the system's failure detection. However, if the subsequent monitoring of the test campaign also results in a failure or error message, the diagnostic engine attempts to locate points of error in the tested system(s) or service(s) 960 by testing each individual service and determining which, if any, test case does not pass. This is then made available for a terminal to view in a report 970.

Figure 10:
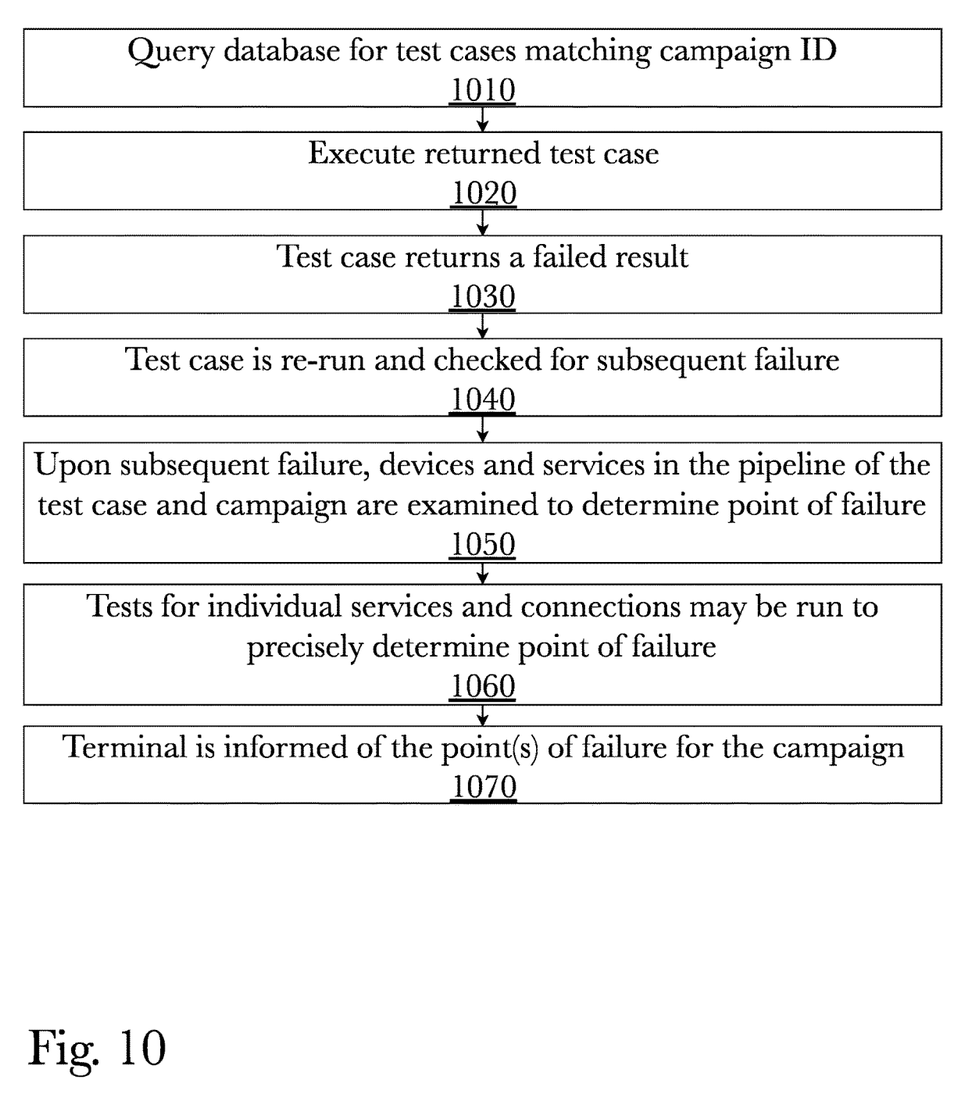
FIG. 10 is a method diagram illustrating the operation of diagnostic tests to locate a fault or error in a contact center after initial failure detection by a diagnostic engine.

FIG. 10 is a method diagram illustrating the operation of diagnostic tests to locate a fault or error in a contact center after initial failure detection by a diagnostic engine. First the diagnostic engine queries the database for test cases matching a given campaign ID 1010, such that it receives the appropriate test cases for whichever campaign is currently operating. The test case is used to execute a test 1020 with the specified parameters and monitored for the specified results in the testcase data, before the test returns a failed result 1030 according to the specified testcase. Such a failure may be an actual reported error code or error message, a failure to respond to a query or connection attempt in the specified amount of time, or failure to respond to a connection or query with the expected response format or content. Upon a testcase failing to be met, the same test is run with the same testcase data a second time 1040 to ensure a repeatable behavior and not a false-positive. Upon subsequent failure, devices and services in the pipeline of the test and campaign are examined to determine point or points of failure 1050, with individual services, connections, components and systems specified being tested to precisely determine any point or points of failure 1060. An accessing terminal is then informed of the results of these tests in a report 1070.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 2:
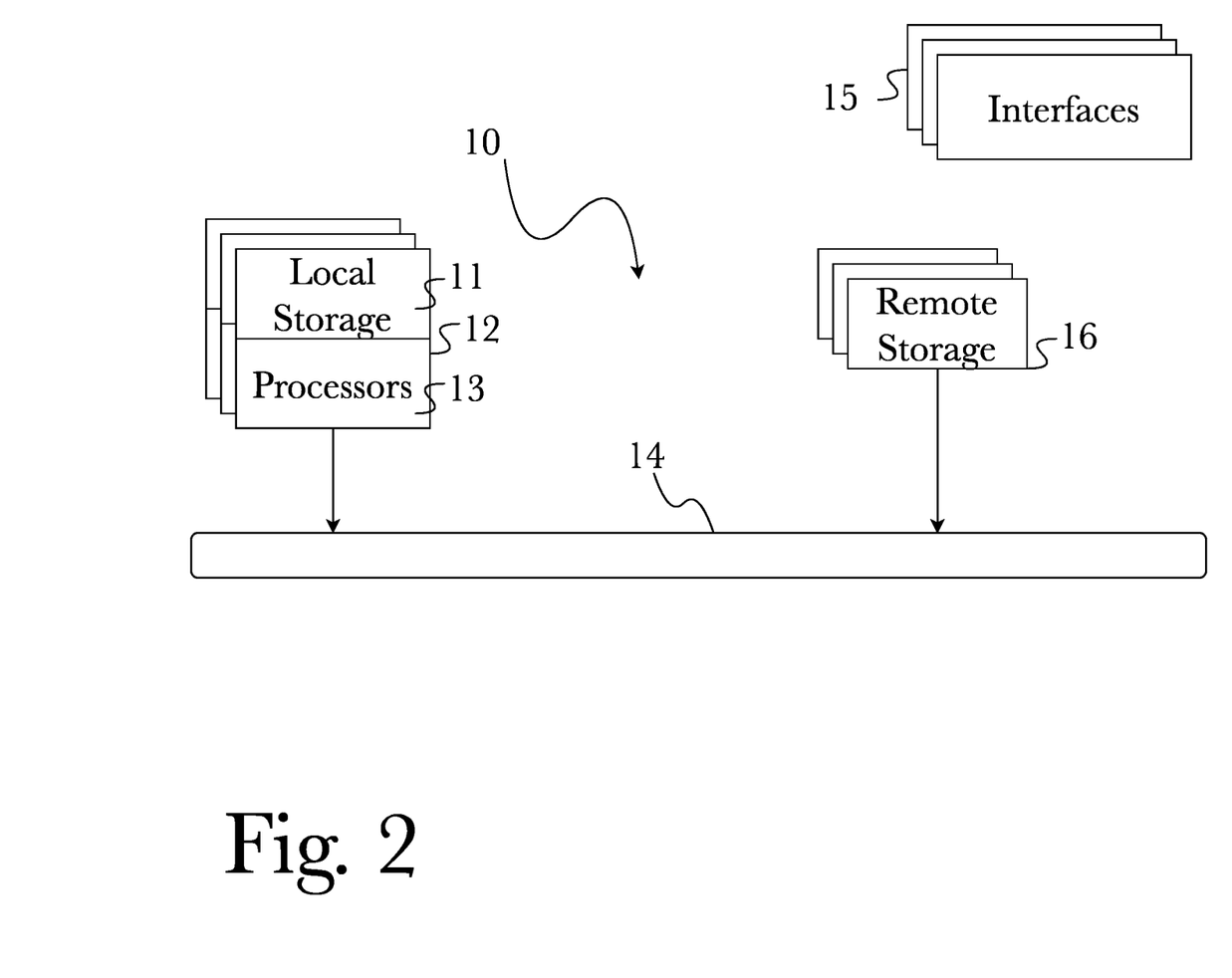
FIG. 2 is a block diagram illustrating an exemplary hardware architecture of a computing device.

Referring now to FIG. 2, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 902.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
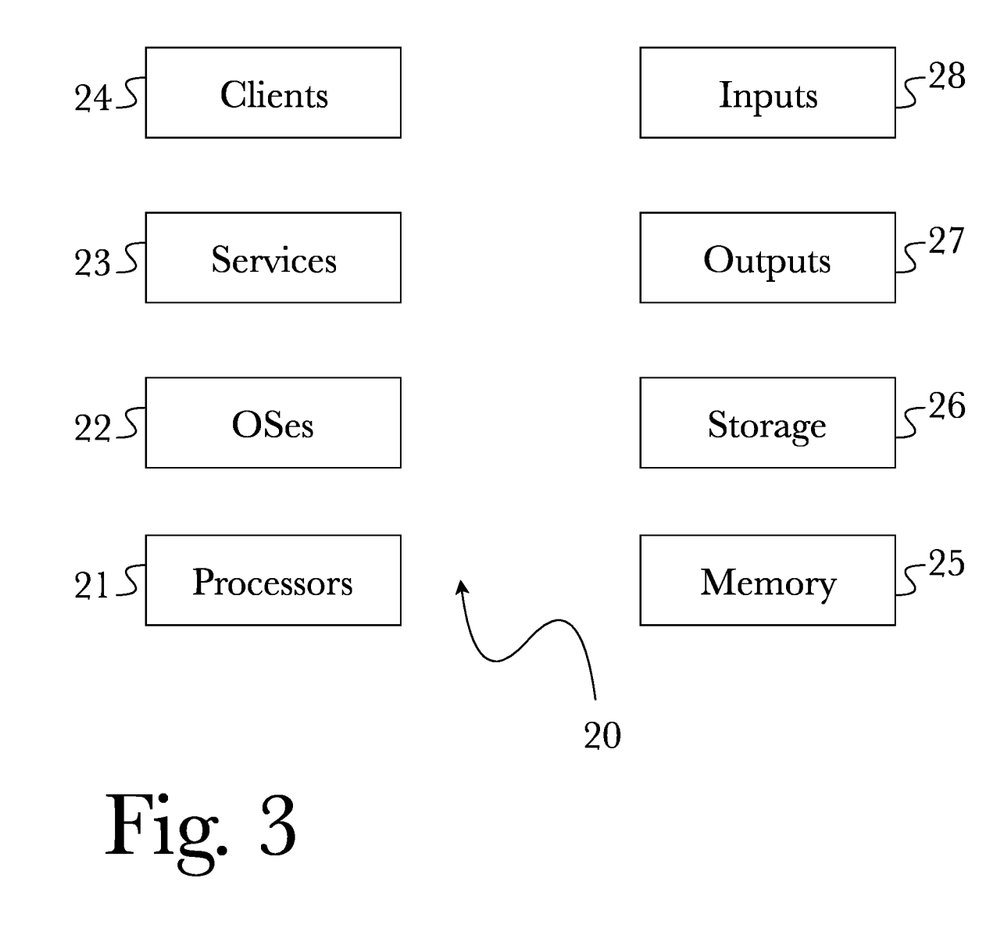
FIG. 3 is a block diagram illustrating an exemplary logical architecture for a client device.

In some aspects, systems may be implemented on a standalone computing system. Referring now to FIG. 3, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 2). Examples of storage devices 26 include flash memory, magnetic hard drive, CD-ROM, and/or the like.

Figure 4:
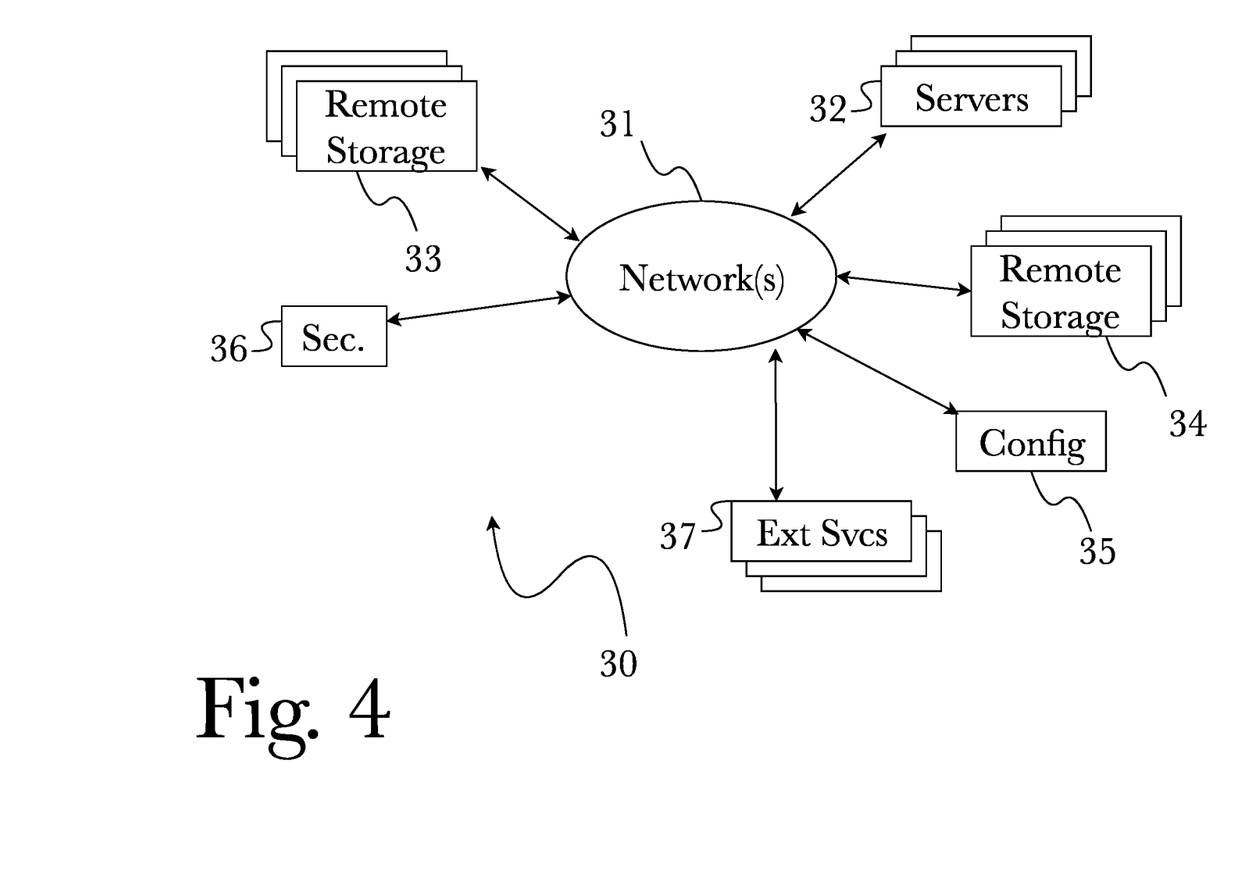
FIG. 4 is a block diagram showing an exemplary architectural arrangement of clients, servers, and external services.

In some aspects, systems may be implemented on a distributed computing network, such as one having any number of clients and/or servers. Referring now to FIG. 4, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 3. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system or approach is specifically required by the description of any specific aspect.

Figure 5:
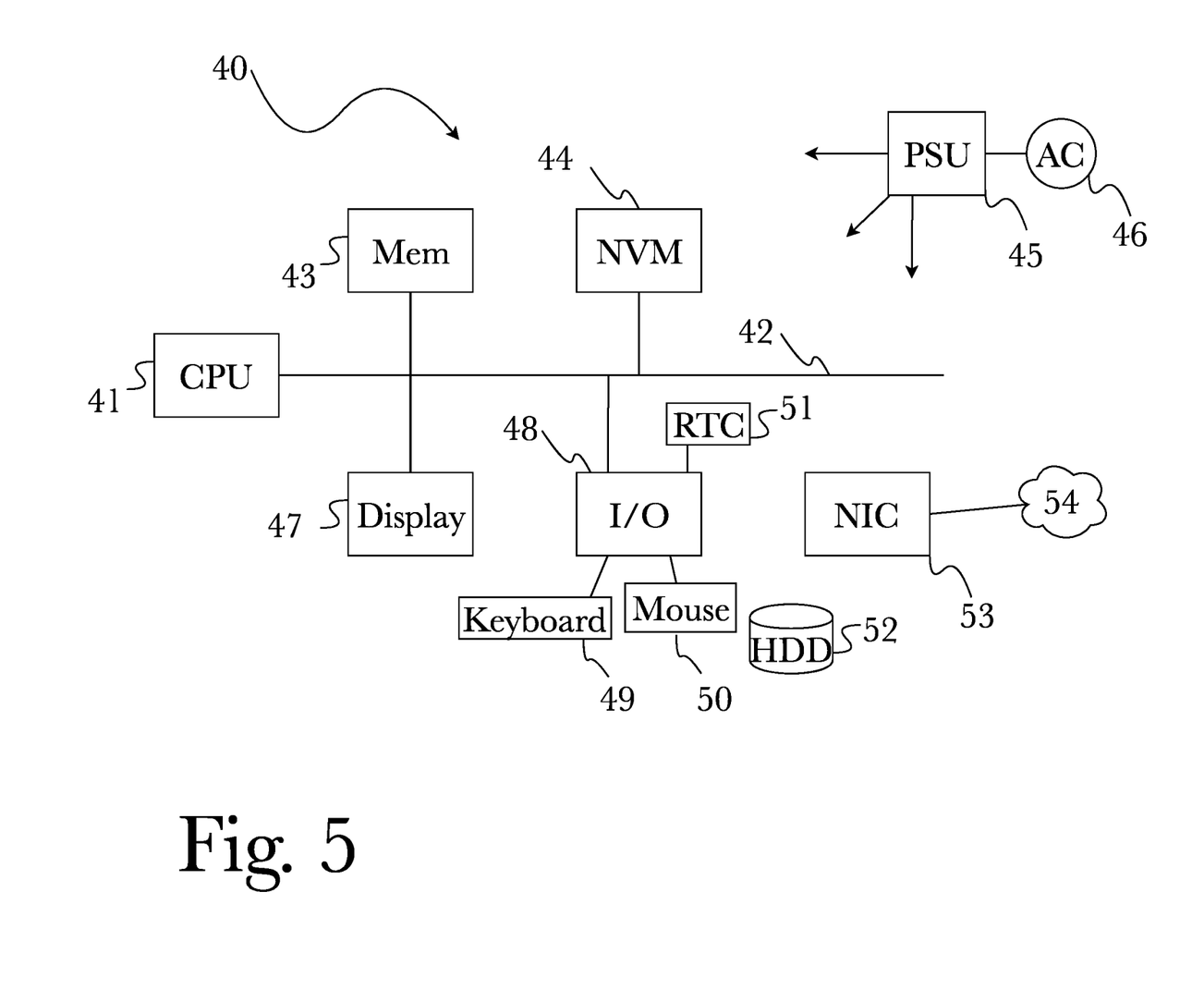
FIG. 5 is another block diagram illustrating an exemplary hardware architecture of a computing device.

FIG. 5 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for contact center fault diagnostics, comprising:
    a diagnostic engine comprising at least a plurality of programming instructions stored in a memory of, and operating on a processor of, a computing device, wherein the plurality of programming instructions, when operating on the processor, cause the computing device to:
    retrieve a plurality of test cases, each test case configured to isolate a root cause of a specific error in operation of a contact center and comprising:
        a chain of known contact center operations associated with the specific error;
        a plurality of components in the chain, wherein each of the components is associated with at least one operation in the chain; and
        an expected response from at least one component to an operational instruction;

for each of a plurality of components in a chain of known contact center operations associated with the error:
send a plurality of operational instructions to the component;
receive a response from the component to at least one sent operational instruction;
calculate a time of response to each sent operational instruction; and
determine whether the component is a root cause of the specific error by evaluating whether its response meets a threshold time of response and whether the response received from the component matches the expected response for that component according to a retrieved test case.

2. The system of claim 1, wherein the diagnostic engine and a database comprising test cases are located on or connected as part of a server which connects to a contact center over a network.

3. The system of claim 1, wherein the diagnostic engine and a database comprising test cases are located on or connected as part of a server which operates within a local network as part of a contact center.

4. The system of claim 1, wherein the diagnostic engine and a database comprising test cases are located on separate servers or computing devices that are separate from each other.

5. A method for contact center fault diagnostics, comprising the steps of:
retrieving one or more test cases for a specific error in contact center operations, using a diagnostic engine;
for each of a plurality of components in a chain of known contact center operations associated with the specific error:
sending a plurality of operational instructions to the component;
receiving a response from the component to at least one sent operational instruction;
calculating a time of response to each sent operational instruction; and
determining whether the component is a root cause of the error by evaluating whether its response meets a threshold time of response and whether the response received for the component matches an expected response for that component according to a retrieved test case, using a diagnostic engine.

6. The method of claim 5, wherein the diagnostic engine and a database comprising test cases are located on or connected as part of a server which connects to a contact center over a network.

7. The method of claim 5, wherein the diagnostic engine and a database comprising test cases are located on or connected as part of a server which operates within a local network as part of a contact center.

8. The method of claim 5, wherein the diagnostic engine and a database comprising test cases are located on separate servers or computing devices that are separate from each other.

* * * * *